United States Patent
Hsu et al.

(10) Patent No.: US 11,226,827 B2
(45) Date of Patent: Jan. 18, 2022

(54) DEVICE AND METHOD FOR REMOTE MANAGEMENT OF INFORMATION HANDLING SYSTEMS

(71) Applicant: DELL PRODUCTS, LP, Round Rock, TX (US)

(72) Inventors: Isaac Hsu, Taipei (TW); Adolfo S. Montero, Pflugerville, TX (US)

(73) Assignee: Dell Products L.P., Round Rock, TX (US)

( * ) Notice: Subject to any disclaimer, the term of this patent is extended or adjusted under 35 U.S.C. 154(b) by 237 days.

(21) Appl. No.: 16/290,025

(22) Filed: Mar. 1, 2019

(65) Prior Publication Data

US 2020/0278873 A1   Sep. 3, 2020

(51) Int. Cl.
  *G06F 9/44*      (2018.01)
  *G06F 9/4401*    (2018.01)
  *G06F 9/445*     (2018.01)
  *G06F 11/14*     (2006.01)

(52) U.S. Cl.
  CPC .......... *G06F 9/4416* (2013.01); *G06F 9/4408* (2013.01); *G06F 9/44505* (2013.01); *G06F 11/1417* (2013.01)

(58) Field of Classification Search
  None
  See application file for complete search history.

(56) References Cited

U.S. PATENT DOCUMENTS

| | | | |
|---|---|---|---|
| 8,407,458 B2 | 3/2013 | Barron, Jr. et al. | |
| 9,250,923 B2* | 2/2016 | Kobres | G06F 11/1451 |
| 9,535,816 B2* | 1/2017 | Young | G06F 11/0784 |
| 9,606,884 B2 | 3/2017 | Herzi | |
| 2010/0082969 A1 | 4/2010 | Barron, Jr. et al. | |
| 2015/0186233 A1* | 7/2015 | Young | G06F 11/0709 |
| | | | 714/38.14 |
| 2016/0292078 A1 | 10/2016 | Hsu et al. | |
| 2016/0306688 A1 | 10/2016 | Boyapalle et al. | |
| 2017/0024303 A1* | 1/2017 | Christopher | G06F 11/366 |
| 2017/0293520 A1 | 10/2017 | Onniyil et al. | |
| 2018/0210922 A1 | 5/2018 | Hsu et al. | |

* cited by examiner

*Primary Examiner* — Fahmida Rahman
(74) *Attorney, Agent, or Firm* — Larson Newman, LLP

(57) ABSTRACT

A mobile device receives a request for diagnosis from an information handling system in a service mode, diagnoses the information handling system in response to the request, and executes a routine to troubleshoot the information handling system based on results of the diagnosing the information handling system. The mobile device accesses the information handling system at a basic input/output system level while executing the routine to troubleshoot.

20 Claims, 4 Drawing Sheets

DEVICE AND METHOD FOR REMOTE MANAGEMENT OF INFORMATION HANDLING SYSTEMS

FIELD OF THE DISCLOSURE

The present disclosure generally relates to information handling systems and more particularly relates to remote management of information handling systems.

BACKGROUND

As the value and use of information continue to increase, individuals and businesses seek additional ways to process and store information. One option is an information handling system. An information handling system generally processes, compiles, stores, and/or communicates information or data for business, personal, or other purposes. Because technology and information handling needs and requirements may vary between different applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, reservations, enterprise data storage, or global communications. In addition, information handling systems may include a variety of hardware and software resources that may be configured to process, store, and communicate information and may include one or more computer systems, data storage systems, and networking systems.

SUMMARY

A mobile device receives a request for diagnosis from an information handling system in a service mode, and may diagnose the information handling system in response to the request. The mobile device then executes a routine to troubleshoot the information handling system based on results of the diagnosing the information handling system. The mobile device accesses the information handling system at a basic input/output system level while executing the routine to troubleshoot.

BRIEF DESCRIPTION OF THE DRAWINGS

The following description in combination with the Figures is provided to assist in understanding the teachings disclosed herein. The following discussion will focus on specific implementations and embodiments of the teachings. This focus is provided to assist in describing the teachings, and should not be interpreted as a limitation on the scope or applicability of the teachings. However, other teachings can certainly be used in this application. The teachings can also be used in other applications and with several different types of architectures, such as distributed computing architectures, client/server architectures, or middleware server architectures and associated resources. It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings indicates similar or identical items.

DETAILED DESCRIPTION OF THE DRAWINGS

The following description in combination with the Figures is provided to assist in understanding the teachings disclosed herein. The description is focused on specific implementations and embodiments of the teachings, and is provided to assist in describing the teachings. This focus should not be interpreted as a limitation on the scope or applicability of the teachings.

Described herein is a system and techniques for performing out-of-band (OOB) management, also referred to herein as remote management, of information handling systems using the mobile device. Remote management includes diagnosing and troubleshooting hardware and software issues that may occur prior to and after the start or boot of the information handling system. Remote management may also include remediation process or routine to correct error conditions such that the information handling system may resume normal operations. An agent or an application initiates a connection with the mobile device when an issue is detected such as when a hard drive of the information handling system is absent, corrupt, or needs repair.

Some of the embodiments described herein use the mobile device that is provisioned with an information handling system in a networked environment. It should be appreciated that these examples are for illustrative purposes and the present disclosure is not so limited.

Figure 1:
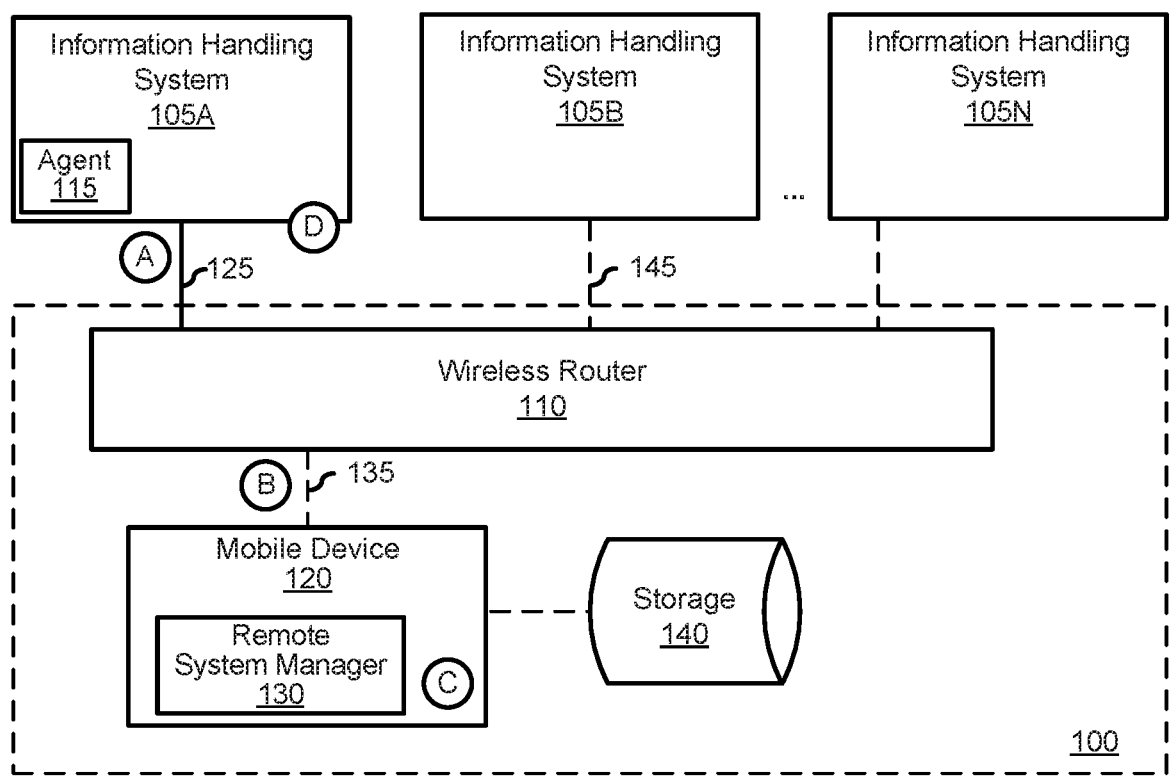
FIG. 1 is a block diagram illustrating one embodiment of a system for remote diagnosis and management of an information handling system.

FIG. 1 shows a system 100 for remote diagnosis and management of information handling systems 105A-N. System 100 includes a mobile device 120, a remote system manager 130, and a storage device 140. Mobile device 120 is communicatively connected to a wireless router 110 via a wireless connection 135. Mobile device 120 may be a tablet, a cellular telephone, or a personal digital assistant (PDA).

In one embodiment, mobile device 120 is configured to perform management, diagnosis, troubleshooting, and/or remediation of one or more of information handling systems 105 over a network. Each of information handling systems 105 includes an agent 115 and has a pre-boot network access at system Basic Input/Output System (SBIOS) local area network (LAN) networking capability or Universal Serial Bus (USB) LAN OOB connection. Information handling systems 105 may be connected to the wireless router 110 via a communication medium such as a network cable 125 or a wireless connection 145. Mobile device 120 may be configured through remote system manager 130 to exchange data with at least one of information handling systems 105 over the network.

Agent 115 allows information handling system 105A to connect to remote system manager 130 in mobile device 120 via the communication medium. For example, information handling system 105A connects to a wireless access point through a network cable. Mobile device 120 may be connected to the same access point through wireless or WiFi® protocols. The connection also allows an OOB SBIOS level, such as when information handling system 105A is in a service mode and/or booted to the network (such as a PXE boot) to connect to a management device that is running a full OS stack such as mobile device 120 in order to perform serviceability and/or manageability operations. The ability to connect to the management device running a full OS stack leverages infrastructure and functionality that is currently not available at the SBIOS level. For example, using remote system manager 130, a user may be able to browse cloud content or mobile device 120 for images such as boot or OS images and select an image that the user wants to install to information handling system 105A. Because both information handling system 105A and mobile device 120 are connected to the same access point on a local network, they may communicate with each other under a default network configuration even if the external network has been firewalled. The ability to communicate with each other allows information handling system 105A to perform a pre-boot execution environment (PXE) boot from remote system manager 130 in mobile device 120. This also allows remote system manager 130 to perform recovery tasks for information handling system 105A. For example, remote system manager 130 or a user may boot information handling system 105 to the network from mobile device 120.

The communication medium may use any one or more of a variety of networks or another type of communication connections as known to those skilled in the art. The type of communication connection used may vary with certain system parameters and requirements, such as those related to bandwidth and throughput required in accordance with a rate of data requests as may be issued by information handling system 105A. The communication connection may be a network connection, bus, and/or another type of data link, such as a hardwire or other connections known in the art. For example, the communication medium may use the internet, an intranet, network or other wireless or other hardwired connection(s) by which information handling system 105A may access and communicate with mobile device 120.

The communication medium may use a variety of different communication protocols such as small computer system interface (SCSI), enterprise systems connection (ESCON), Fibre Channel, internet small computer system interface (iSCSI), or Gigabit Ethernet (GigE), and the like. Some or all of the connections by which information handling system 105A and mobile device 120 may be connected to the communication medium may pass through other communication devices, such as switching equipment, a phone line, a repeater, a multiplexer or a satellite.

Each of information handling systems 105 and mobile device 120 may all be located at the same physical site or may be in different physical locations. Each of information handling systems 105 may perform different types of data operations in accordance with different tasks and applications. A user may be able to connect and manage information handling system 105A through remote system manager 130, which is an information handling system serviceability/manageability application.

Remote system manager 130 may also perform serviceability/management functions on information handling system 105A such as software imaging, software update, and software configurations to be deployed to information handling system 105A. Remote system manager 130 may also perform other functions such as enabling or performing device discovery, tracking of assets (such as hardware or software inventory) of information handling system 105A, monitoring the health or status of information handling system 105A, applying one or more policies to information handling system 105A (including network settings), or remote administration and shadowing of the information handling system. Remote system manager 130 may deliver any suitable resources including, operating systems (OS), add-ons, content, or any other suitable data, applications, or images to one or more of information handling systems 105.

In one embodiment of FIG. 1, mobile device 120 may issue a request to any one of information handling systems 105 such as to perform a data operation. For example, an application executing on one of information handling systems 105 may perform a read or write operation resulting in one or more data requests.

For illustration purposes, information handling system 105A is referred to in the following paragraphs. However, it is understood that the current disclosure is not limited to information handling system 105A but instead is applicable to any one of information handling systems 105. FIG. 1 is annotated with a series of letters A-C. The current disclosure also refers to an agent as performing functions. It is understood that the functionality may be performed by an application or the like that resides in information handling system 105A. Each of these letters represents a stage of one or more operations. Although these stages are ordered for this example, the stages illustrate one example to aid in understanding this disclosure and should not be used to limit the claims. Subject matter falling within the scope of the claims can vary with respect to the order of the operations.

At stage A, a provisioning process between information handling system 105A and mobile device 120 is performed. Provisioning allows mobile device 120 that hosts remote system manager 130 to discover and manage information handling system 105A. Provisioning includes establishing trust between mobile device 120 and information handling system 105A which allows mobile device 120 to perform functions such as remote management and remediation. Prior to provisioning, the program instructions may be configured to perform authentication and authorization procedures such as by using information in the configuration file. The configuration file may be stored locally in mobile device 120 and/or information handling system 105A or in a centralized storage location. The configuration file may contain credentials that may be used for authentication, authorization and/or validation of services between mobile device 120 and information handling system 105A in order for mobile device 120 to remotely manage information handling system 105A. For example, the configuration file may contain account username and password, IP address, MAC address and/or a globally unique identifier (GUID) of mobile device 120 and/or information handling system 105A. In another example, the configuration file may contain information regarding a Dynamic Host Configuration Protocol (DHCP), an Active Directory and/or a Domain Name System (DNS) server.

During provisioning, configuration settings such as the authorization and authentication credentials and/or hardware information may be transmitted to remote system manager 130. In one embodiment, remote system manager 130 may store the authentication credentials and image mapping information in a database to authenticate information handling system 105A and discover its image. The provisioning process may also use a provisioning certificate to validate the credentials and establish trust between mobile device 120 and information handling system 105A. The provisioning certificate may be a valid certificate from a trusted third-party Certificate Authority (CA), or a self-signed certificate, or both. In addition, the configuration settings may include other information such as a unique identifier of the host, the MAC address of the host, a model number and/or serial number of the host, hardware configuration (such as type of processor, memory, network device), network identity information (such as computer name, domain name, and IP address), and event data (such as event logs, core dump and debug logs). The information transmitted from information handling system 105A to mobile device 120 may be encrypted (such as with a 256-bit encryption) and transferred using Secure Socket Layer (SSL) protocol. The public key infrastructure (PKI) authenticates the identity of users and devices by means of signed public key pairs in the form of digital certificates. The Internet Engineering Task Force (IETF) introduced the Enrollment over Secure Transport (EST) protocol to provision these certificates. After provisioning, information handling system 105A appears in the interface of remote system manager 130 in mobile device 120.

The provisioning process may also include a provisioning policy. The provisioning policy defines or describes rules, instructions and/or prerequisites associated with the management of information handling systems 105. The provisioning policy may contain information regarding the hardware and software resources of information handling system 105A. The provisioning policy may also explain the role of information handling system 105A in the network. Remote system manager 130 may, therefore, download applications, drivers or utilities that will be used by information handling system 105A in performing the role. Exemplary embodiments may thus use the provisioning policy to determine the software service that satisfies the resources needed by information handling system 105A.

The provisioning policy may also include prerequisites of use. Remote system manager 130 may impose restrictions that must first be satisfied. For example, if information handling system 105A and/or agent 115 fails to achieve or to match any prerequisite, remote system manager 130 may restrict or deny participation. A prerequisite of use may be authentication and/or affiliation. If information handling system 105A cannot successfully authenticate to remote system manager 130, access may be denied. Moreover, remote system manager 130 may also require that information handling system 105A may be preapproved, especially in an enterprise environment. Other prerequisites may be imposed such as remote system manager 130 may impose hardware and/or firmware requirements.

Under normal circumstances, information handling system 105A successfully boots to an OS such as a Windows® or Linux® operating system. The OS and a BIOS/UEFI module may be configured to monitor and report successful or unsuccessful launching of the OS. For example, the Windows OS specification provides a Simple Boot Flag (SBF) register to allow the OS to notify the BIOS/UEFI module when a boot failure has occurred. During a subsequent boot attempt, the BIOS/UEFI module can perform routines to try to diagnose or identify a reason for the previous boot failure. The SBF specification specifies that a BOOTING indicator is initially set by the BIOS/UEFI module, and is later reset by the OS to indicate that the OS was successfully loaded. During a subsequent boot operation, such as during a Power-on Self Test (POST), the BIOS/UEFI module can access the SBF register. If the BOOTING indicator is still set, the BIOS/UEFI module can determine that a prior attempt to load the OS was unsuccessful.

In one embodiment, one or more error signals and/or additional flags can be utilized to maintain a strike count, indicating a number of successive boot failures. For example, if a first boot operation failed due to a transient error, a subsequent attempt to boot the OS may be successful. The BIOS/EUFI module can include capabilities to perform diagnosis, but these capabilities may be limited, for example, by storage constraints of a non-volatile random access memory (NVRAM). Mobile device 120 can extend these capabilities, for example, mobile device 120 can gain access to a disk drive of information handling system 105A, remotely mount the drive, diagnose and troubleshoot the problem that is preventing successful boot of information handling system 105A and/or remediate the problem by deploying a boot image allowing information handling system 105A to boot successfully from the disk drive.

At stage B, agent 115 initiates a connection to mobile device 120. Agent 115 may put the information handling system into the service mode prior to initiating the connection. The connection initiated may be an OOB network connection or an in-band network connection. The OOB network connection may be established using an OOB management controller. In another example, the OOB network connection may be established using an OOB network interface controller (NIC). For example, OOB network connection can include system administrator traffic used to access the management controller which may be established using a private network, secure connection, or any combination thereof. The OOB NIC can include various types of communication module, and in one form can include an Ethernet communication module and/or a wireless communication module. Agent 115, which monitors and detects hardware issues, resides on a service partition of the hard drive of each of information handling systems 105. Hardware issues that may be diagnosed, troubleshoot, and/or remediated may be at the SBIOS level. By default, agent 115 may be enabled in information handling system 105A. If agent 115 is disabled, a user may enable agent 115 in the BIOS settings. Alternatively, agent 115 may be configured to automatically be enabled when a hardware failure occurs. The network connection to mobile device 120 is initiated when an issue is detected such as when information handling system 105A is unable to boot into the OS. The network connection to mobile device 120 may be initiated by agent 115 and/or BIOS/EUFI module using the wireless connection 135 which may be configured in the BIOS settings beforehand. In another embodiment, agent 115 and/or the BIOS/EUFI module scans for a wireless network and displays a list of the available wireless network(s). The user may then select the wireless network from the list. The network connection settings such as authentication and/or authorization credentials, a physical media access card (MAC) address or IP address of mobile device 120 may be set up in a configuration file and used to initiate the network connection to mobile device 120.

The network connection to mobile device 120 may be initiated during a network boot such as the PXE boot. The PXE boot is one of several network boot options, that allows the BIOS/EUFI module and a network interface card (NIC) to bootstrap a computer from a network and is used herein for illustration. However, other network boot options may be used instead of the PXE boot option such as a Hypertext Transfer Protocol (HTTP) boot option and a UNDI boot option. In another embodiment, agent 115 may also initiate the network connection to remote system manager 130 of mobile device 120 periodically (such as weekly, monthly, quarterly). The network connection may also be initiated manually by the user or an administrator.

At stage C, the network connection is established between mobile device 120 and information handling system 105A. The network connection may have a channel for communications that features end-to-end encryption, authentication, and data integrity. Information handling system 105A may verify itself to mobile device 120 based upon its possession of a private/public key pair. The private key may be used to decrypt information encrypted with the public key. The holder of the key pair may disseminate the public key. Parties wishing to communicate with the holder may encrypt messages with the public key. The holder, the only entity possessing the private key may be the only party capable of decrypting the messages. Thus, the messages to the private key holder may be secure. In turn, the holder may verify its identity by constructing a signature of a message by using the private key. When an entity possessing the public key verifies that the signature is valid, the entity knows that the sender of the message must possess the private key. The parties, such as information handling system 105A and the mobile device 102 may negotiate on a format for exchanging messages and exchange private keys that will be used to encrypt the messages.

At stage D, the user may be able to perform various tasks to information handling system 105A using remote system manager 130. For example, the user may select a boot image for information handling system 105A. The boot image may be selected from various internal or external storage devices available to mobile device 120 such as storage device 140. Storage device 140 may be in a local network storage, a remote database in a cloud that accessible via web, etc. In another example, storage device 140 may be a flash drive, secure digital (SD) card etc. The boot image may be a generic boot image or an OS (such as Windows, Linux, Suse Linux®, etc.) image. The generic boot image may comprise a pre-OS environment that may enable information handling system 105A to boot with minimal but sufficient resources to allow it to deploy the OS image. Storage device 140 may store the boot image(s). The boot image(s) may be accessible from mobile device 120 using standard commands (SCSI commands) or via application programming interfaces (APIs).

Remote system manager 130 may thus select the appropriate boot image that best suit or is compatible with the hardware capabilities and/or software capabilities of information handling system 105A. Remote system manager 130 may customize the boot image for information handling system 105A. Remote system manager 130 may also customize the boot image for information handling system 105A to ensure that the boot image is bootable for information handling system 105A. In addition, remote system manager 130 may update the boot image when an updated version is available. Remote system manager 130 may download the boot image to information handling system 105A. Mobile device 120 may send the boot image as a stream of data to the network address associated with information handling system 105A.

Figure 2:
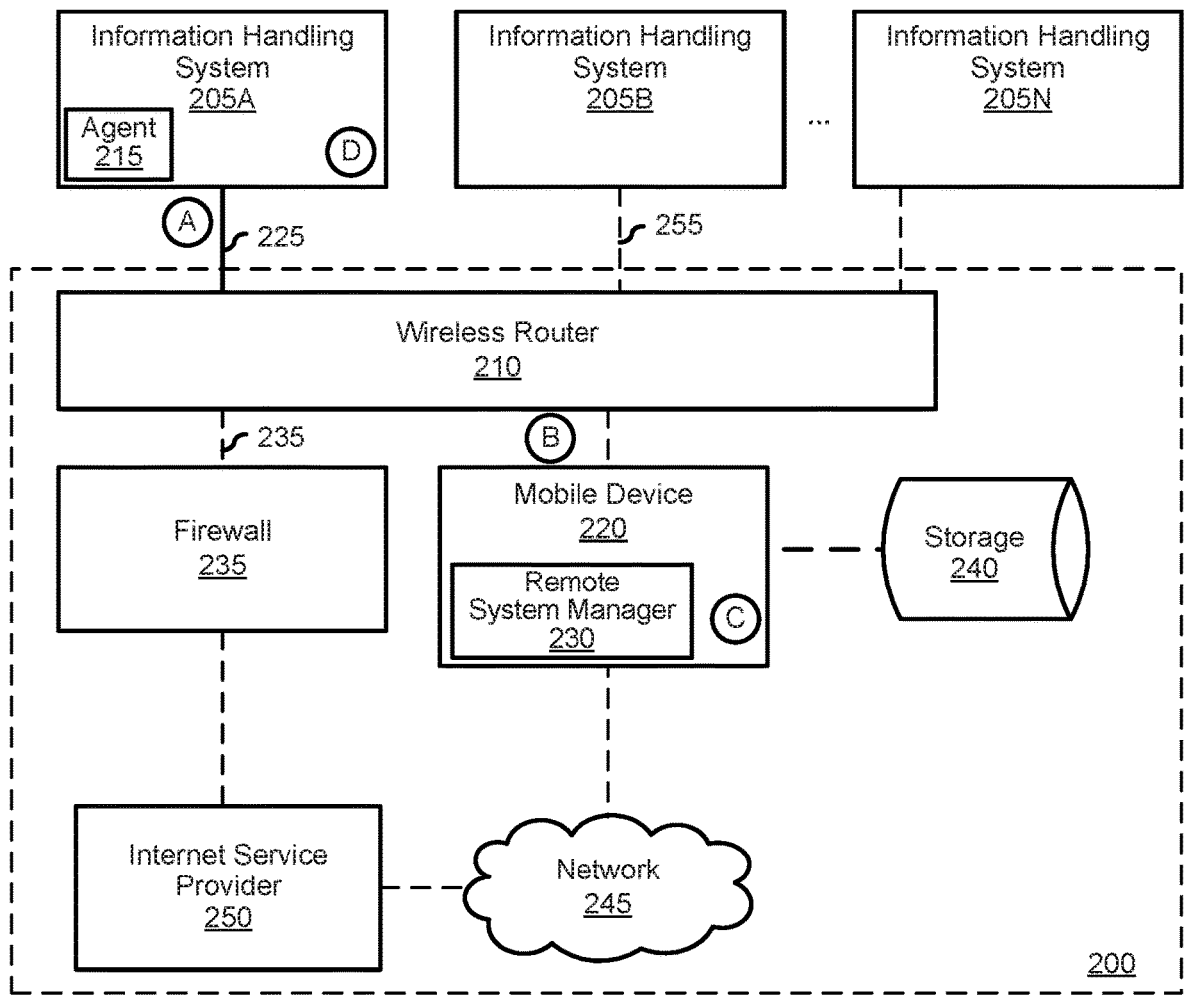
FIG. 2 is a block diagram illustrating another embodiment of the system for the remote management of the information handling system.

FIG. 2 shows a system 200 for remote diagnosis and management of information handling systems 205A-N. System 200 may include a mobile device 220 that is communicatively connected to a wireless router 210 via a wireless connection. Mobile device 220 may be a tablet, a cellular telephone, a personal digital assistant, a smartwatch, or the like. Mobile device 220 may include an internal storage device or may be communicatively connected to a storage device 240 that is external to mobile device 220. System 200 may be connected to a network 245 behind a firewall 235. Network 245 may be connected to an internet service provider 250. Other embodiments of system 200, for example, variations of system 200, are possible and are intended to fall within the scope of the disclosure.

In one embodiment, mobile device 220 is configured to perform management, diagnosis and/or remediation of an information handling system 105A or the information handling system(s) 105A-N (information handling systems 105) over the network. Each of information handling systems 205 may include an agent 215. Information handling systems 205 may be connected to wireless router 210 via a communication medium such as a network cable 225, or via a wireless connection 255. For example, information handling system 205A can communicate with mobile device 220 over a Wi-Fi network provided by a WLAN.

System 200 can include a wired network, a wireless network, a local area network, a wide area network, a combination of such networks, and the like. System 200 may be implemented as or may be a part of a storage area network (SAN), personal area network (PAN), local area network (LAN), a metropolitan area network (MAN), a wide area network (WAN), a wireless local area network (WLAN), a virtual private network (VPN), an intranet, the Internet, cellular telecommunications network, or any other appropriate architecture or system that facilitates the communication of signals, data and/or messages (generally referred to as data). System 200 may transmit data using any storage and/or communication protocol, including without limitation, Fibre Channel, Frame Relay, Asynchronous Transfer Mode (ATM), Internet Protocol (IP), other packet-based protocol, small computer system interface (SCSI), Internet SCSI (iSCSI), advanced technology attachment (ATA), serial ATA (SATA), advanced technology attachment packet interface (ATAPI), serial storage architecture (SSA), integrated drive electronics (IDE), and/or any combination thereof. System 200 may be implemented using hardware, software, or any combination thereof.

Information handling system 205A may be positioned behind a firewall and may be connected by internal networks, which may include one or more local area networks (LANs), such as a campus LAN and a management LAN. Since both information handling system 205A and mobile device 220 are connected to the same access point of the local network, both will be able to communicate with each other under default network configuration even if the external network has been firewalled. This will allow information handling system 205A to perform the PXE boot from mobile device 220.

A person of ordinary skill in the art will appreciate that the systems 100 and 200 are merely illustrative and are not intended to limit the scope of the disclosure described herein and other means of communication between illustrated components may be used. In particular, information handling systems 205 and devices may include any combination of hardware or software that can perform the indicated operations. In addition, the operations performed by the illustrated components may in some embodiments, be performed by fewer components or distributed across additional components. Similarly, in other embodiments, the operations of some of the illustrated components may not be performed and/or other additional operations may be available. Accordingly, systems and methods described herein may be implemented or executed with other information handling system configurations.

At stage A, agent 215 detects an issue with information handling system 205A. The issue detected may be a hardware or a software issue. The issue may prevent information handling system 205A from booting from the hard drive. Agent 215, an application or the like, which monitors and/or detects hardware issues, may reside on a service partition of a hard drive of each of information handling systems 205. When the information handling system 205 is turned on the BIOS/EUFI module performs a Power On Self Test (POST) before loading a boot program. The boot program may be loaded from the hard drive or from a remote location if the system is configured to use the network boot option such as the PXE boot option. The BIOS settings may have been configured for the network device as the first boot device in the boot device list. For example, the PXE boot option may be selected by the user during a boot sequence such as by hitting an F12 key during a splash screen and selecting the PXE boot option. In another embodiment, the BIOS settings may have been configured to use the network device as the first boot device in the boot device list. The agent may perform a PXE boot after detecting the issue.

A processor of information handling system 205A or firmware like a BIOS/EUFI module executes one or more routines for diagnosis in response to an error signal that corresponds to a failure or malfunction. In another embodiment, the processor generates the error signal automatically when the POST fails. In one embodiment, routines for diagnosis may include re-initializing or re-booting information handling system 205A. In an alternate embodiment, the user may manually generate the error signal by pressing a pre-defined hot-key combination on a keyboard. Possible hot-key combinations include, but are not limited to, simultaneously pressing a function key and the power button, or pressing an escape key and the power button.

At stage B, agent 215 identifies mobile device 220. Because information handling system 205A is not provisioned, agent 215 may request the user to identify a mobile device with a remote system manager such as mobile device 220. For example, a graphical user interface with a text box to input a MAC address or IP address of mobile device 220 may be shown. Remote system manager 230 provides the user of mobile device 220 with an interface that permits the user to remotely monitor and manage information handling system 205A. Alternatively, agent 215 may display a list of mobile devices to choose from. The list may be retrieved from a configuration file that may be locally or externally stored which is accessible by agent 215. In yet another embodiment, information handling system 205A may automatically select mobile device 220 from the list of mobile devices.

At stage C, agent 215 initiates a request for an OOB network connection to mobile device 220. The OOB network connection may be a local area network (LAN) connection. The OOB network connection may also be a USB LAN OOB network connection. As mentioned earlier, the OOB connection to mobile device 220 may be initiated during the network boot. Once the OOB connection is successful, mobile device 220 is able to connect remotely to information handling system 205A. The OOB connection may be accepted manually by the user of remote system manager 230. In another embodiment, remote system manager 230 may automatically determine whether to accept the OOB connection. For example, remote system manager 230 may check if the MAC address of information handling system 205A that initiated the OOB connection request is included in a safe list. The safe list may contain information regarding information handling systems 205, account names and/or credentials that are deemed safe. Once the OOB connection is successful, remote system manager 230 can remotely manage, diagnose, and/or troubleshoot the issue(s) of information handling system 205A.

At stage D, remote system manager 230 monitors, diagnose, and remediates information handling system 205A. For example, remote system manager 230 can power down, instantiate a virtual machine or deploy an OS image to information handling system 205A. After deploying the OS image, remote system manager 230 may also provision information handling system 205A. Mobile device 220 may contain entries detailing parameters and/or requirements associated with information handling system 205A that may be used by mobile device 220 in managing and/or the provisioning of information handling system 205A. In another embodiment, the user such as the administrator or a technical support specialist may manually diagnose, troubleshoot and/or manage information handling system 205A through the interface of remote system manager 230.

Figure 3:
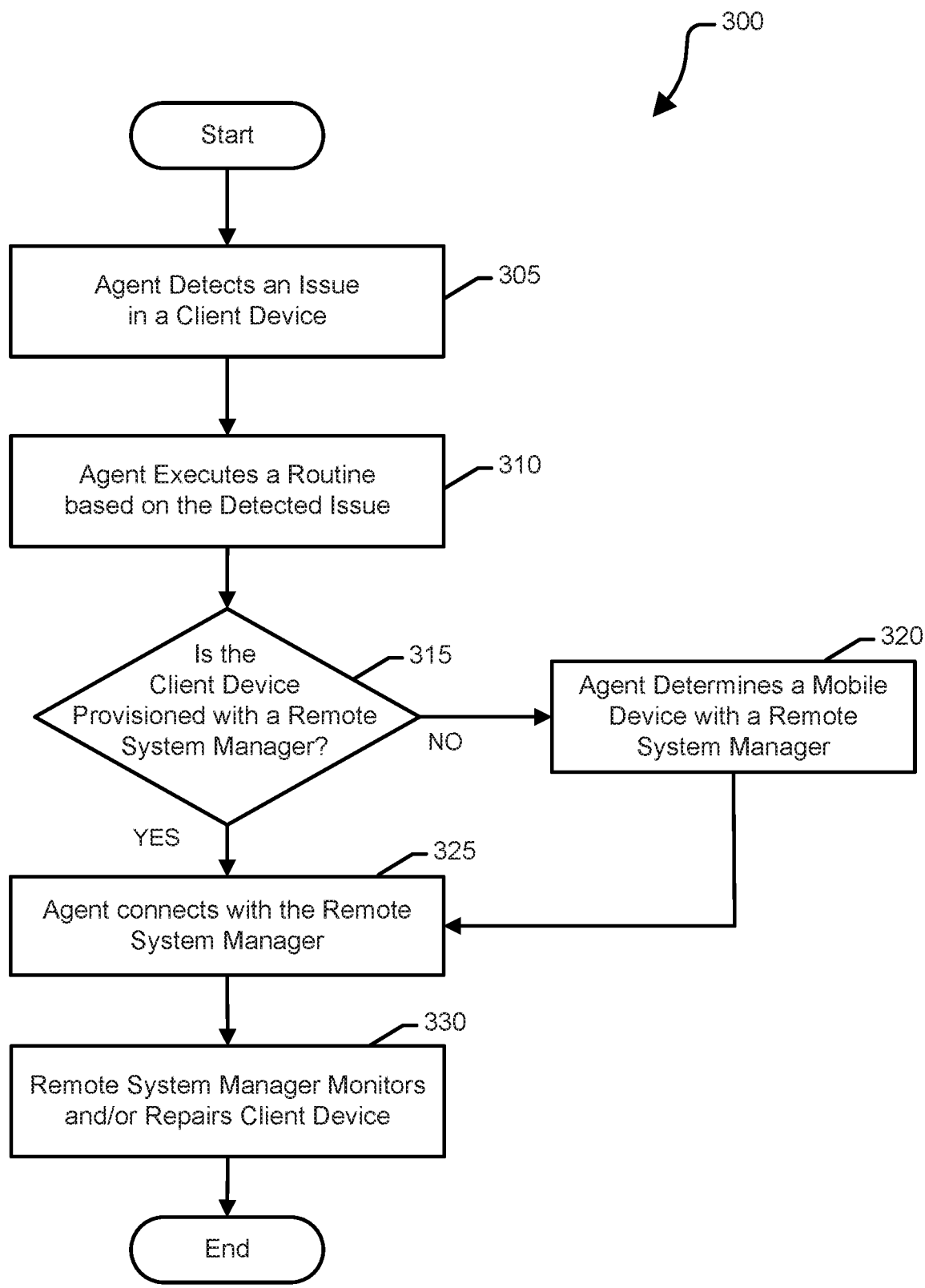
FIG. 3 is a flow chart showing a method of implementing the remote management of a client device, in accordance with an exemplary embodiment.

FIG. 3 is a flowchart showing a method implementing the remote management of a client device. Although presented in a particular sequence, any suitable sequence of the following steps or actions may be performed. At block 305, an agent detects an issue or exception with the client device. The exception may be detected via an error signal which corresponds to a failure in a hard drive of the client device. The client device may be an information handling system that is provisioned to be remotely managed by a second information handling system such as a server or a mobile device. In another example, the agent may predict potential issue or exception with the client device. For example, the agent may predict that the hard drive of the client device may fail due to an increase number of failing sectors. At block 310, the agent executes a routine based on the detected exception. For example, the agent may put the information handling device in service mode. In addition, the agent may boot the information handling system to the network. In yet another example, the agent may transmit a support request regarding the exception to the remote system manager. The support request may include information regarding the exception such as a log file, stack trace, configuration information, etc. In yet another example, the support request may include access point to enable the remote system manager to automatically collect information regarding the exception. For example, the agent performs the PXE boot after the information handling system fails to boot successfully from an OS in the hard drive, such as when the information handling system's hard drive is missing, corrupt or needs repair. The PXE boot is an open industry standard and supported by a number of hardware and software vendors. The BIOS may launch the PXE code that may, for example, be part of a firmware of a NIC that is then loaded into memory and run. The PXE code uses the NIC as a boot device which sends out a broadcast request to a DHCP server. The DHCP request may include configuration parameters specific to the PXE boot. The DHCP server responds to the request made by the information handling system which may include an IP address. In addition to the IP address, the PXE code may receive information including a list of IP addresses of available PXE boot servers on the network (e.g., including different types of PXE boot servers) as well as name or names of network boot program (NBP) files that reside on the boot servers. The PXE code may then download the NBP file from a PXE boot server on the network (using, for example, Trivial File Transfer Protocol (TFTP)), copy it to a location in the RAM of the information handling system, and execute the NBP, thereby transferring control of the information handling system to the NBP.

At block 315, the agent determines whether the information handling system is provisioned with a second information handling system. In this illustration, the second information handling system may be the mobile device. For example, the agent may check registry settings, and/or configuration settings, etc. If the agent determines that the information handling system is not provisioned, the flow continues to block 320. At block 320, the agent identifies the mobile device with a remote system manager that the agent can initiate a network connection. The network connection may be an OOB connection or an in-band connection. The agent may display a graphical user interface where the user may input an identifier of the mobile device such as a MAC address or an IP address. If the information handling system is provisioned, the flow continues to block 325. At a block 325, the agent initiates a connection with the mobile device. The agent may initiate an OOB connection with the mobile device. The agent may initiate the network connection while the information handling system is in service mode. The agent transmits at least one request for diagnosis to the mobile device. The request may include information such as receiving, by a hardware processor in a mobile device, at least one request from a first information handling system, wherein the information handling system is in a service mode. The request may include information such as the information handling system's configuration settings, error code or signal, exception stack, and log files. At block 330, after a successful OOB connection, the remote system manager may begin to manage the client device. A remote system manager may be an application that is deployed in the mobile device such as a tablet, a cellular telephone, a smartwatch, or a smartphone. The remote system manager application may be generally operable to allow the user, such as a network administrator and/or information technology professional, to manage, configure, and/or monitor the information handling system. For example, the remote system manager may analyze the information received with the request such as the information handling system's configuration settings, error code or signal, exception stack, and log files. In addition, the remote system manager may be configured to execute a routine for diagnosis against the information handling system in response to the received request for diagnosis. After executing the routine, a report may be generated. Based on the report, a troubleshooting and/or remediation routine may be performed by the mobile device against the information handling system. For example, the remote system manager may select, transmit and deploy an OS image to the information handling system allowing the information handling system to boot successfully. In another example, the remote system manager may recover the last known working BIOS version. Before proceeding with remotely managing an information handling system, a certificate that is used for secure communications may be validated.

Prior to deploying the OS image, the remote system manager identifies the OS image associated with the information handling system. The remote system manager may be agnostic to the location of the OS image. For example, the OS image may be stored in the mobile device, a storage device attached to the mobile device or a service provider. The information handling system may not participate in selecting the OS image nor the location of the OS image. The information handling system may merely advertise for a resource and allows the remote system manager in the mobile device to identify the resource. For example, the information handling system may transmit at least one request to the mobile device. The request may be associated with the detected issue or exception. The request may be transmitted with an exception stack, log files, and other information such as identifying information of the information handling system. However, the information handling system may need to enable the remote system manager before the remote system manager is allowed to perform functions such as to manage, diagnose and/or remediate issues the information handling system. For example, the information handling system may validate a signature accompanying the response. In another embodiment, the remote system manager may determine the needed resource of the information handling system.

The remote system manager mounts the boot image and checks to see if the boot image is bootable on the information handling system. If the boot image is not bootable on the information handling system, the remote system manager loads the hardware drivers from the host or gets drivers from an online or other centralized image repositories such as storage device or a database. The remote system manager adds the drivers in the boot image onto the information handling system and customizes the boot image (e.g., registry etc.) to make the boot image bootable for the information handling system hardware platform.

Figure 4:
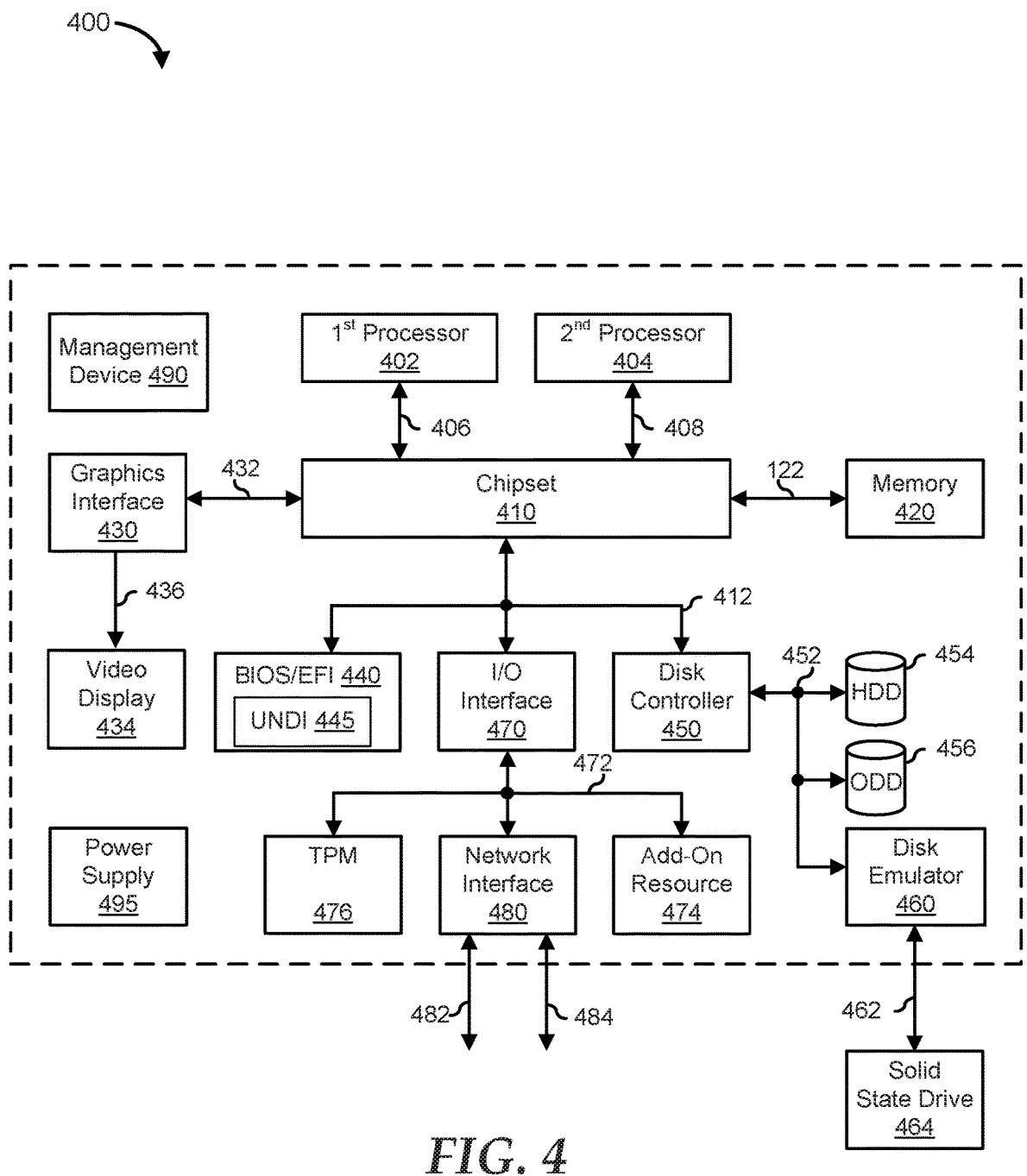
FIG. 4 illustrates a generalized embodiment of the information handling system.

FIG. 4 illustrates a generalized embodiment of an information handling system 400. For purpose of this disclosure information handling system 400 can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 400 can be a personal computer, a laptop computer, a smartphone, a tablet device or other consumer electronic device, a network server, a network storage device, a switch router or other network communication device, or any other suitable device and may vary in size, shape, performance, functionality, and price. Further, information handling system 400 can include processing resources for executing machine-executable code, such as a central processing unit (CPU), a programmable logic array (PLA), an embedded device such as a System-on-a-Chip (SoC), or other control logic hardware. Information handling system 400 can also include one or more computer-readable medium for storing machine-executable code, such as software or data. Additional components of information handling system 400 can include one or more storage devices that can store machine-executable code, one or more communications ports for communicating with external devices, and various input and output (I/O) devices, such as a keyboard, a mouse, and a video display. Information handling system 400 can also include one or more buses operable to transmit information between the various hardware components.

Information handling system 400 can include devices or modules that embody one or more of the devices or modules described below and operates to perform one or more of the methods described below. Information handling system 400 includes a processors 402 and 404, a chipset 410, a memory 420, a graphics interface 430, a basic input and output system/universal extensible firmware interface (BIOS/UEFI) module 440, a universal network driver interface (UNDI) 445, a disk controller 450, a hard disk drive (HDD) 454, an optical disk drive (ODD) 456, a disk emulator 460 connected to an external solid state drive (SSD) 464, an input/output (I/O) interface 470, one or more add-on resource 474, a trusted platform module (TPM) 476, a network interface 480, a management device 490, and a power supply 495. The BIOS/UEFI module 440 may be stored in the NVRAM. Processors 402 and 404, chipset 410, memory 420, graphics interface 430, BIOS/UEFI module 440, disk controller 450, HDD 454, ODD 456, disk emulator 460, SSD 464, I/O interface 470, add-on resource 474, TPM 476, and network interface 480 operate together to provide a host environment of information handling system 400 that operates to provide the data processing functionality of the information handling system. The host environment operates to execute machine-executable code, including platform BIOS/UEFI code, device firmware, operating system code, applications, programs, and the like, to perform the data processing tasks associated with information handling system 400.

In the host environment, processor 402 is connected to chipset 410 via processor interface 406, and processor 404 is connected to the chipset via processor interface 408. Memory 420 is connected to chipset 410 via a memory bus 422. Graphics interface 430 is connected to chipset 410 via a graphics interface 432 and provides a video display output 436 to a video display 434. In a particular embodiment, information handling system 400 includes separate memories that are dedicated to each of processors 402 and 404 via separate memory interfaces. An example of memory 420 includes random access memory (RAM) such as static RAM (SRAM), dynamic RAM (DRAM), non-volatile RAM (NVRAM), or the like, read only memory (ROM), another type of memory, or a combination thereof.

BIOS/UEFI module 440 which includes UNDI 445, disk controller 450, and I/O interface 470 are connected to chipset 410 via an I/O channel 412. An example of I/O channel 412 includes a Peripheral Component Interconnect (PCI) interface, a PCI-Extended (PCI-X) interface, a high speed PCI-Express (PCIe) interface, another industry standard or proprietary communication interface, or a combination thereof. Chipset 410 can also include one or more other I/O interfaces, including an Industry Standard Architecture (ISA) interface, a Small Computer Serial Interface (SCSI) interface, an Inter-Integrated Circuit ($I^2C$) interface, a System Packet Interface (SPI), a USB, another interface, or a combination thereof. BIOS/UEFI module 440 includes BIOS/UEFI code operable to detect resources within information handling system 400, to provide drivers for the resources, initialize the resources, and access the resources. BIOS/UEFI module 440 includes code that operates to detect resources within information handling system 400, to provide drivers for the resources, to initialize the resources, and to access the resources. UNDI 445 represents functions and features that allow information handling system 400 to access and control network resources such as network interface 480.

Disk controller 450 includes a disk interface 452 that connects the disk controller to HDD 454, to ODD 456, and to disk emulator 460. An example of disk interface 452 includes an Integrated Drive Electronics (IDE) interface, an Advanced Technology Attachment (ATA) such as a parallel ATA (PATA) interface or a serial ATA (SATA) interface, an SCSI interface, a USB interface, a proprietary interface, or a combination thereof. Disk emulator 460 permits SSD 464 to be connected to information handling system 400 via an external interface 462. An example of external interface 462 includes a USB interface, an IEEE 4394 (Firewire) interface, a proprietary interface, or a combination thereof. Alternatively, SSD 464 can be disposed within information handling system 400.

I/O interface 470 includes a peripheral channel 472 that connects the I/O interface to add-on resource 474, to TPM 476, and to network interface 480. Peripheral channel 472 can be the same type of interface as I/O channel 412 or can be a different type of interface. As such, I/O interface 470 extends the capacity of I/O channel 412 when peripheral channel 472 and the I/O channel are of the same type, and the I/O interface translates information from a format suitable to the I/O channel to a format suitable to the peripheral channel 472 when they are of a different type. Add-on resource 474 can include a data storage system, an additional graphics interface, a network interface card (NIC), a sound/video processing card, another add-on resource, or a combination thereof. Add-on resource 474 can be on a main circuit board, on separate circuit board or add-in card disposed within information handling system 400, a device that is external to the information handling system, or a combination thereof.

Network interface 480 represents a NIC disposed within information handling system 400, on a main circuit board of the information handling system, integrated onto another component such as chipset 410, in another suitable location, or a combination thereof. Network interface 480 includes network channels 482 and 484 that provide interfaces to devices that are external to information handling system 400. In a particular embodiment, network channels 482 and 484 are of a different type than peripheral channel 472 and network interface 480 translates information from a format suitable to the peripheral channel to a format suitable to external devices. An example of network channels 482 and 484 includes InfiniBand channels, Fibre Channel channels, Gigabit Ethernet channels, proprietary channel architectures, or a combination thereof. Network channels 482 and 484 can be connected to external network resources (not illustrated). The network resource can include another information handling system, a data storage system, another network, a grid management system, another suitable resource, or a combination thereof.

Management device 490 represents one or more processing devices, such as a dedicated baseboard management controller (BMC) System-on-a-Chip (SoC) device, one or more associated memory devices, one or more network interface devices, a complex programmable logic device (CPLD), and the like, that operate together to provide the management environment for information handling system 400. In particular, management device 490 is connected to various components of the host environment via various internal communication interfaces, such as a Low Pin Count (LPC) interface, an Inter-Integrated-Circuit (I2C) interface, a PCIe interface, or the like, to provide an 00B mechanism to retrieve information related to the operation of the host environment, to provide BIOS/UEFI or system firmware updates, to manage non-processing components of information handling system 400, such as system cooling fans and power supplies. Management device 490 can include a network connection to an external management system, and the management device can communicate with the management system to report status information for information handling system 400, to receive BIOS/UEFI or system firmware updates, or to perform another task for managing and controlling the operation of information handling system 400. Management device 490 can operate off of a separate power plane from the components of the host environment so that the management device receives power to manage information handling system 400 when the information handling system is otherwise shut down. An example of management device 490 may include a commercially available BMC product that operates in accordance with an Intelligent Platform Management Initiative (IPMI) specification, such as an Integrated Dell Remote Access Controller (iDRAC), or the like. Management device 490 may further include associated memory devices, logic devices, security devices, or the like, as needed or desired.

Power supply 495 represents one or more devices for power distribution to the components of information handling system 400. In particular, power supply 495 can include a main power supply that receives power from an input power source, such as a wall power outlet, a power strip, a battery, or another power source, as needed or desired. Here, power supply 495 operates to convert the power at a first voltage level from the input power source to one or more power rails that are utilized by the components of the information handling system. Power supply 495 can also include one or more voltage regulators (VRs) that each receive power from the main power supply and that operate to convert the input voltage to an output voltage that is used by one or more components of information handling system. For example, a VR can be provided for each of processors 402 and 404, and another VR can be provided for memory 420. Power supply 495 can be configured to provide a first power plane that provides power to the host environment and to provide a second power plane that provides power to the management environment.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents but also equivalent structures.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents, and shall not be restricted or limited by the foregoing detailed description.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable medium that includes instructions or receives and executes instructions responsive to a propagated signal; so that a device connected to a network can communicate voice, video or data over the network. Further, the instructions may be transmitted or received over the network via the network interface device.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories.

Further, the computer-readable medium can be a random access memory or other volatile re-writable memory. Additionally, the computer-readable medium can include a magneto-optical or optical medium, such as a disk or tapes or other storage device to store information received via carrier wave signals such as a signal communicated over a transmission medium. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

What is claimed is:

1. A mobile device for communication with an information handling system, the mobile device comprising:
    an out-of-band network controller configured to interface with a hardware processor of the mobile device; and
    the hardware processor that receives an out-of-band request for diagnosis from an agent included in the information handling system in a service mode, wherein the hardware processor is configured to:
        diagnose the information handling system based on the out-of-band request, and execute a routine to troubleshoot the information handling system based on results of the diagnosis, wherein the routine to troubleshoot the information handling system includes to deploy an operating system image to the information handling system;
        prior to deployment of the operating system image, determine whether the operating system image is bootable on the information handling system, and in response to the operating system image is not bootable, customize the operating system image to make it bootable on the information handling system; and
        communicate with the agent in the information handling system via a pre-boot encrypted network access at a system basic input/output system level in response to receiving a signal indicating an issue with the information handling system, wherein the mobile device is connected to the information handling system via an access point of a local area network.

2. The mobile device of claim 1, wherein the out-of-band request for the diagnosis includes configuration settings of the information handling system.

3. The mobile device of claim 1, wherein the out-of-band request for the diagnosis includes an exception stack associated with a detected exception in the information handling system.

4. The mobile device of claim 3, wherein the diagnosis includes analyzing the exception stack.

5. The mobile device of claim 1, wherein the hardware processor further:
    selects an image for the information handling system; and
    transmits the image to the information handling system.

6. The mobile device of claim 5, wherein the image is stored remotely from the mobile device and from the information handling system.

7. A method comprising:
receiving, by a mobile device, at least one out-of-band request for a diagnosis from an agent of an information handling system in a service mode, wherein the agent initiates a pre-boot network access at a system basic input/output level with the mobile device upon detecting an issue by the agent in the information handling system, and wherein the mobile device and the information handling system are both connected to an access point of a local area network;
diagnosing the information handling system in response to the out-of-band request;
executing a routine to troubleshoot the information handling system based on results of the diagnosing the information handling system, wherein the routine to troubleshoot the information handling system includes deploying an operating system image to the information handling system;
determining whether the operating system image is bootable or not bootable on the information handling system prior to deploying the operating system image; and
determining that the operating system image is not bootable;
in response to the determining that the operating system image is not bootable, customizing the operating system image to make it bootable on the information handling system.

8. The method of claim 7, wherein the out-of-band request for the diagnosis includes configuration settings of the information handling system.

9. The method of claim 7, wherein the out-of-band request for the diagnosis includes an exception stack associated with a detected exception in the information handling system.

10. The method of claim 9, wherein the diagnosing includes analyzing the exception stack.

11. The method of claim 7, further comprising:
selecting an image for the information handling system;
transmitting the image to the information handling system; and
deploying the image on the information handling system.

12. The method of claim 11, wherein the image is located in a storage device located remotely from the mobile device and from the information handling system.

13. A method comprising:
provisioning, by an agent, between an information handling system and a mobile device, wherein the provisioning allows the mobile device to discover and manage the information handling system, wherein the agent has a pre-boot network access at a basic input/output system level with the mobile device, and wherein after provisioning, data regarding the information handling system appears in an interface of the mobile device;
detecting an exception in the information handling system, including detecting an error signal corresponding to a failure of the information handling system;
executing an exception handling routine in response to detecting the exception, wherein the exception handling routine includes initiating the information handling system into a service mode that includes booting the information handling system into a pre-operating system network boot;
establishing a connection between the information handling system and the mobile device, wherein the mobile device includes a remote system manager, wherein the mobile device and the information handling system are connected to an access point of a local area network, and wherein the connection is initiated by the agent upon detecting an issue in the information handling system;
transmitting at least one out-of-band request for diagnosis to the mobile device, wherein the out-of-band request is associated with the exception;
receiving a response from the mobile device to the out-of-band request for the diagnosis that a routine for diagnosing the exception;
enabling the mobile device to execute the routine for the diagnosis in the information handling system, wherein the routine includes deploying an operating system image to the information handling system;
determining whether the operating system image is bootable or not bootable on the information handling system prior to deploying the operating system image; and
determining that the operating system image is not bootable;
in response to the determining that the operating system image is not bootable, customizing the operating system image to make it bootable on the information handling system.

14. The method of claim 13, wherein the provisioning includes establishing trust between the information handling system and the mobile device.

15. The method of claim 13, wherein provisioning includes configuration settings from a configuration file.

16. The method of claim 13, wherein the exception includes a hard drive of the information handling system.

17. The method of claim 13, wherein the pre-operating system network boot is a pre-boot execution environment boot.

18. The method of claim 13, wherein the remote system manager is a software management application for diagnosing and troubleshooting the information handling system.

19. The method of claim 13, wherein the connection is an out of band connection.

20. The method of claim 13, wherein the out-of-band request for the diagnosis includes a log file associated with the exception in the information handling system.

* * * * *